United States Patent [19]

Graham

[11] Patent Number: 4,749,236
[45] Date of Patent: Jun. 7, 1988

[54] MECHANICALLY ACTUATED, HYDRAULICALLY DEACTUATED BRAKE SYSTEM

[76] Inventor: John M. Graham, 820 N. Delaware, No. 308, San Mateo, Calif. 94401

[21] Appl. No.: 108,406

[22] Filed: Oct. 14, 1987

Related U.S. Application Data

[63] Continuation-in-part of Ser. No. 28,812, Mar. 20, 1987, Pat. No. 4,722,575.

[51] Int. Cl.⁴ .............................................. B60T 13/74
[52] U.S. Cl. ..................................... 303/2; 188/170; 303/9.76; 303/71; 303/10
[58] Field of Search .............................. 303/2–3, 303/10–12, 6, 13–15, 71, 18, 16–17, 84, 968; 188/170; 192/3 R; 137/116, 493

[56] References Cited

U.S. PATENT DOCUMENTS

| | | | |
|---|---|---|---|
| 2,899,025 | 8/1959 | Marosi | 188/170 |
| 3,425,221 | 2/1969 | Canfield | 188/170 X |
| 3,985,210 | 10/1976 | Hodge et al. | 188/170 |
| 4,072,360 | 2/1978 | Carroll et al. | 303/2 |
| 4,407,548 | 10/1983 | Graham | 303/6 M |
| 4,440,189 | 4/1984 | Graham | 137/116 |
| 4,576,418 | 3/1986 | Holzinger et al. | 303/71 |
| 4,589,704 | 5/1986 | Graham | 303/6 M |

Primary Examiner—Douglas C. Butler
Attorney, Agent, or Firm—Townsend and Townsend

[57] ABSTRACT

A vehicle brake system includes a check valve having an input port coupled to a fluid pump outlet and an output port coupled to hydraulically deactuated spring brakes through brake lines. A pilot check valve has a pilot port, an inlet port coupled to the input port of the check valve and a return port coupled to the fluid reservoir. The pilot port is coupled to the output port of the check valve so the pilot check valve opens only when the output port is pressurized. This allows hydraulic fluid to flow from the pump, through the pilot check valve and to the reservoir. To set the brakes when stopped or in emergency situations the operator actuates a valve which dumps the fluid in the brake lines into the reservoir. A second pilot check valve has its pilot port connected to a brake pedal actuated master cyinder, its inlet connected to the brake line and its outlet connected to the reservoir. Pressing on the brake pedal connects the brake line to the reservoir through a variable restriction so to allow the spring brakes to be applied in the modulated manner of service brakes.

23 Claims, 4 Drawing Sheets

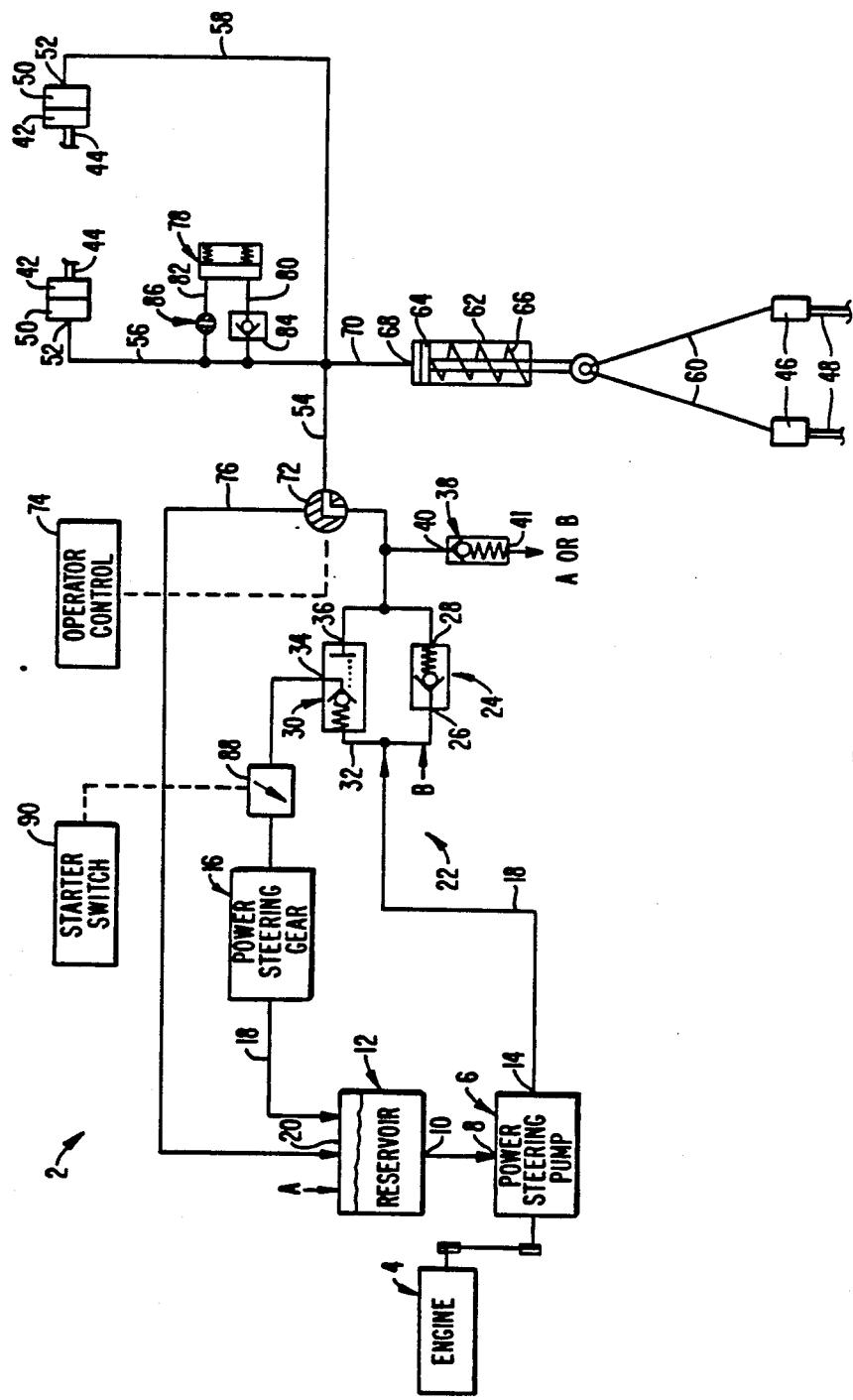
FIG._1.

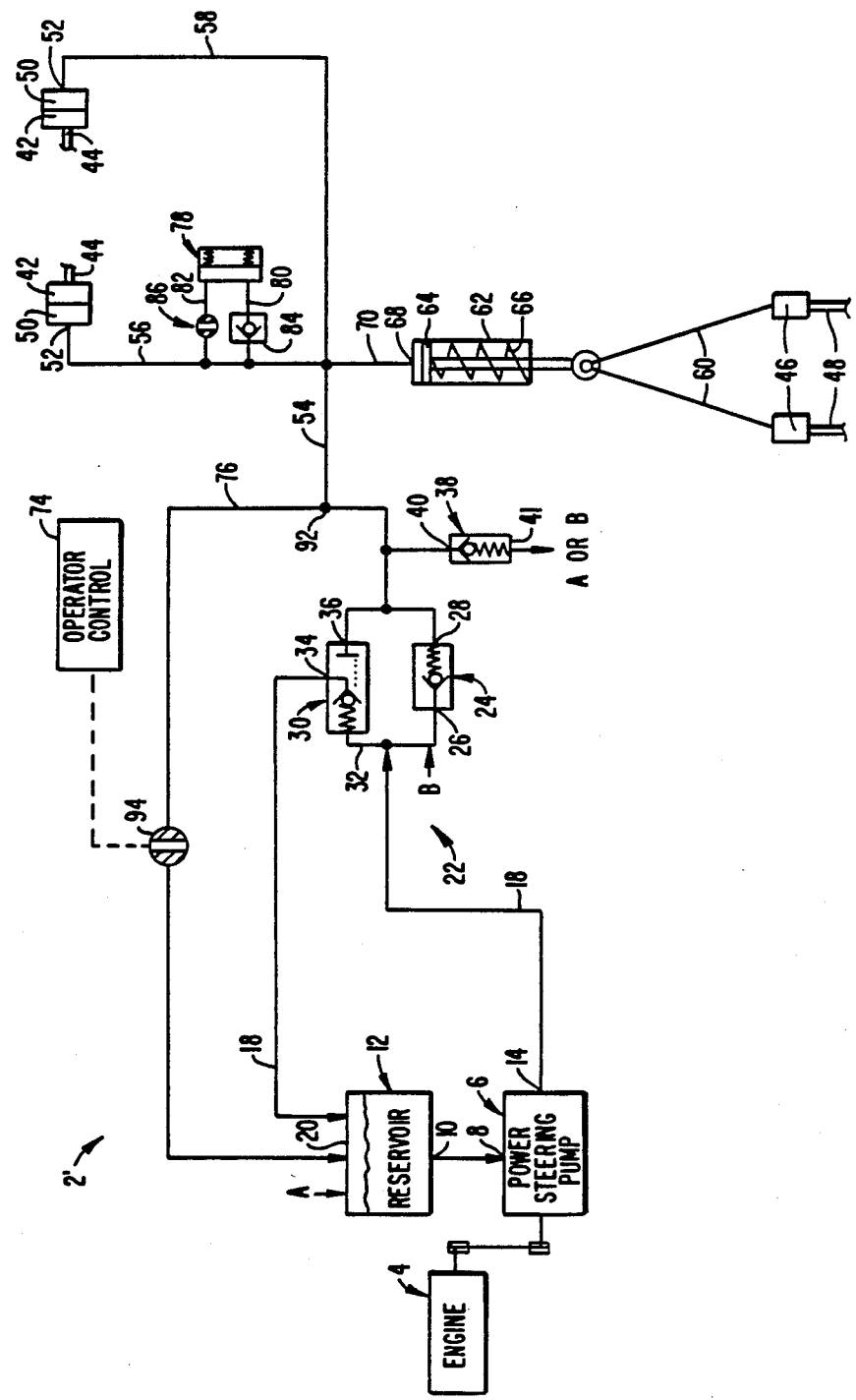
FIG._2.

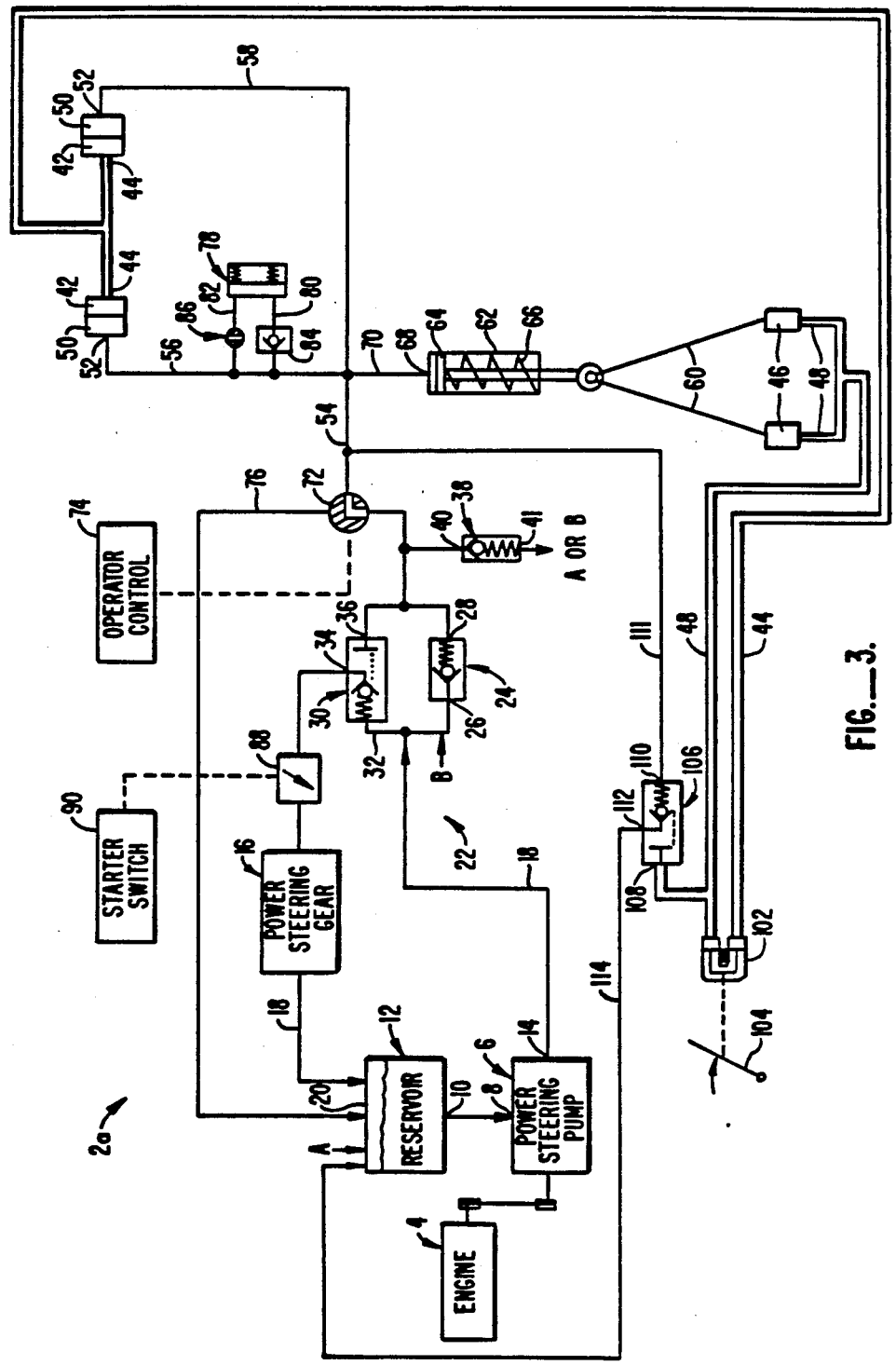
FIG._3.

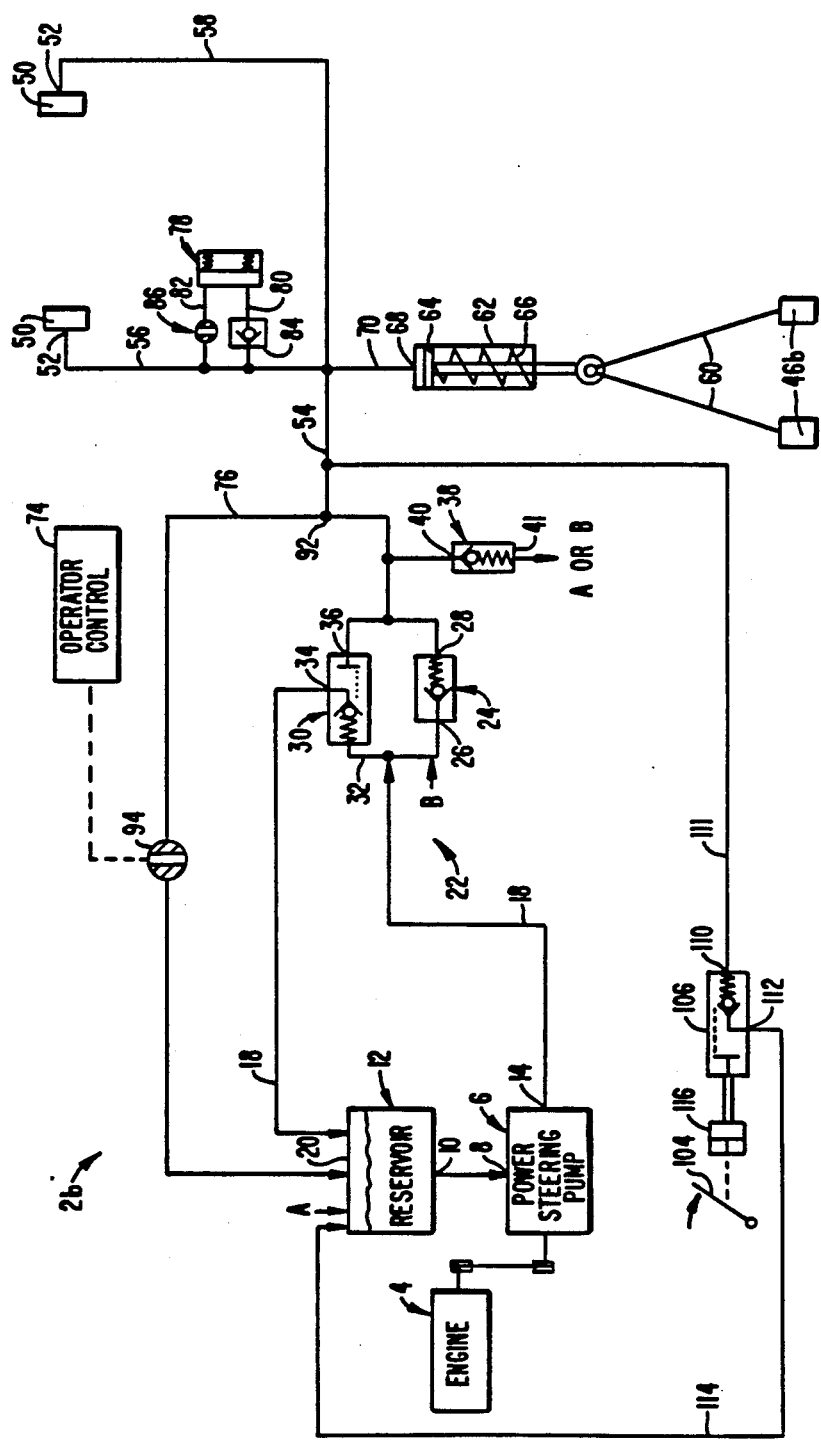
FIG._4.

MECHANICALLY ACTUATED, HYDRAULICALLY DEACTUATED BRAKE SYSTEM

BACKGROUND OF THE INVENTION

This application is a continuation-in-part of U.S. patent application Ser. No. 028.812 filed Mar. 20, 1987 entitled Mechanical Emergency and Parking Brake System, now U.S. Pat. No. 4,722,575.

Automobiles and light trucks usually have hydraulic service brakes and cable actuated parking brakes. Parking brakes, by law, are restricted to the use of mechanical braking force. However, since conventional parking brakes can apply only about one tenth the braking force that hydraulically actuated service brakes can apply, they are often quite ineffective at stopping a vehicle during an emergency, such as when the service brakes fail while the vehicle is moving. The result of a service brake failure, or the failure of parking brakes such as when parked on a steep incline, is often catastrophic.

Many, if not most, automotive vehicles have power assisted brakes. The power assist most commonly is achieved using the engine vacuum. However, because of the higher performance now expected from automotive engines, tapping into the engine vacuum whenever the brakes are applied can cause many control and performance problems.

Perhaps in response to this, the Bendix Corporation of South Bend, Ind. has developed a power assisted brake system called Hydroboost. Instead of tapping off of the engine vacuum the Bendix system uses pressurized fluid from either the power steering pump or from an auxiliary electrically operated hydraulic pump. Although the Bendix system eliminates the potential control and performance problems which can result from tapping engine vacuum it remains a service brake power assist system. Therefore if fluid pressure is lost the user is left with a vehicle which may be very difficult, or even impossible, to stop using the service brakes.

SUMMARY OF THE INVENTION

The present invention is directed to a mechanically actuated hydraulically deactuated service, power, emergency and parking brake system for vehicles using the vehicle's conventional power steering pump which requires minimal changes to the braking system.

One embodiment of the system includes a check valve having an input port coupled to the power steering pump outlet and an output port coupled to hydraulically deactuated, mechanically applied brakes. The brakes can be either disc type, spring disc type, drum type or both disc and drum types. For sake of simplicity, these brakes will sometimes be referred to as spring disc or spring brakes. A pilot valve has its inlet port coupled to the input port of the check valve and a return port coupled to the power steering gear. The pilot port of the pilot valve is coupled to the output port of the check valve the pilot valve opens, allowing fluid to flow through the pilot valve, through the steering gear and back to the reservoir, only when the fluid pressure at the output port of the check valve is above a chosen pressure. This chosen pressure is sufficient to release the hydraulically deactuated, mechanically applied brakes.

To allow the brakes to be reapplied, the operator actuates a control valve which disconnects the emergency and parking brake lines, which are connected to the hydraulically deactuated mechanically applied brakes, from the output port of the check valve and connects them to the reservoir. Typically this occurs when the operator wishes to set the brakes when parked with the engine off. However, in emergency situations the operator can actuate the control valve to dump the fluid from the emergency and parking brake lines to the reservoir, thus applying the brakes, while the vehicle is in motion.

The system can be adapted to provide mechanically actuated, hydraulically deactuated service braking with minimal changes to the system. A second pilot valve is used with its pilot port connected to one of the service brake lines emanating from the master cylinder. The master cylinder, as is conventional, is connected to the brake pedal. The inlet port of the second pilot valve is connected to the emergency and parking brake line while the outlet port is connected to the reservoir. Pressing on the brake pedal thus operates the conventional hydraulically applied brakes (assuming the vehicle has them) and also opens the second pilot valve. This permits hydraulic fluid in the emergency and parking brake line to flow into the reservoir.

During service brake usage the application of the spring brakes is to be modulated, rather than the full on, full off condition which exists during emergencies and while parked. This is achieved in the same manner as with conventional hydraulically applied brakes: the harder the user pushes on the brake pedal, the greater the force the master cylinder creates in the service brake line. The second pilot valve, being sensitive to the pressure at its pilot port, provides a variable opening for the flow of hydraulic fluid through it. This, coupled with the fact that the power steering pump is constantly pumping fluid into the emergency and parking brake line, provides for the variable or modulated application of the spring brake according to the force on the brake pedal.

If desired, a pressure release valve can be fluidly connected to the output port of the check valve to limit the pressure at the output port. The pressure release valve can be connected in parallel with the check valve or, for example, it can be coupled directly to the reservoir.

In some circumstances it may be desirable to temporarily restrict the flow of hydraulic fluid passing from the first pilot valve, such as during the initial pressurization of the system. In such case a flow restrictor can be placed along the line between the reservoir return port of the pilot valve and the reservoir to provide a substantial resistance to fluid flow along the line, such as while the starter switch is actuated. Thus, when the vehicle is first started an additional pressure can be built up within the emergency, power, and parking brake lines over and above the chosen pressure created by the operation of the pilot valve.

A brake release hydraulic fluid reservoir can be fluidly coupled to the emergency and parking brake lines to provide a reservoir of high pressure hydraulic fluid sufficient to enable the brakes to be released while the engine is not running. This may be useful when the vehicle must be towed. This is accomplished by coupling the reservoir to the brake lines through two lines. The first line includes a check valve and is used to charge the reservoir. The second line is controlled by a user manipulated shutoff valve; the shutoff valve is opened when it is desired to charge the emergency, power, and parking brake lines. Also, a separately powered (e.g. battery powered) auxiliary pump could be used to pressurize the emergency and parking brake lines when it is desired to release the brakes when the engine is not running.

In another embodiment, in which the vehicle does not have power steering but does have a hydraulic pump, such as a conventional power steering pump, the operator can reapply the brakes as follows. Although a control valve could be used, the control valve could be replaced by a T-coupling, one leg connected to the output port of the check valve, a second leg connected to the emergency and parking brake lines and a third leg connected to the reservoir. A user actuated shut-off valve would be placed along the line connecting the T-coupling to the reservoir. Opening the shut-off valve would allow the hydraulic fluid in the emergency and parking brake lines to be dumped into the reservoir regardless of the output from the power steering pump.

The invention provides for the application of mechanically powered brakes, as required for parking brake purposes, which are deactuated by hydraulic pressure. With the invention the operation of the conventional power steering components is essentially unchanged, even while providing true emergency, power, and park-braking, as well as service brakes for the vehicle. Since the deactuation of the mechanical brakes (typically by compressing brake springs) is accomplished by using hydraulic pressure, much stronger brake springs can be used for the brakes then would be possible using conventional manually applied brakes. With the present invention braking forces equal to those available with service brakes can be achieved thus providing true, full-force emergency, power, and parking brakes for the vehicle.

The present invention incorporating the mechanically actuated, hydraulically deactuated service, as well as emergency, power, and park-braking feature provides other important advantages over conventional hydraulic brake systems. With the present invention four wheel disc brakes can be accomplished without the need for existing additional equipment. Power brake components are not required with the present invention. The invention eliminates the need for parking brakes and lights. The system is a fail safe braking system. just the opposite of present hydraulically applied brake systems. The weight savings is expected to be as much as 100 pounds per vehicle. The present invention provides wheel by wheel protection with only a single cylinder master brake cylinder.

The hydraulically released and mechanically applied brake system is considerably safer than the presently accepted hydraulically applied systems because the vehicle remains stationary until necessary brake pressure to stop a vehicle, under any condition, is built up and stored. That is, the vehicle cannot be moved until the pressure necessary to apply the brakes is stored. In contrast, the presently used system of hydraulically applied service brakes stands the chance of not being able to stop the vehicle, once it is rolling, if hydraulic pressure is lost. This concept of storing the power necessary release the brakes before the vehicle can be driven is in stark contrast with the present concept of hoping to have enough brake power to stop once moving. The invention is capable of preventing many accidents, with the associated loss of life, by ensuring full service braking force is always available to stop a moving vehicle. The invention is thus a fail safe braking system which each year can save the countless lives which are now lost due to failure of conventional hydraulically applied brake systems.

The invention could incorporate an anti-theft device which would control the release of the brakes. Such a system could require the entry of some sort of identification number, such as a social security number. before the brakes could be released. An emergency override, such as with a special pass key issued to police, could also be used.

Other features and advantages of the invention will appear from the following description in which the preferred embodiments have been set forth in detail in conjunction with the accompanying drawings.

BRIEF DESCRIPTION OF THE DRAWINGS

FIG. 1 is a schematic representation of a mechanical emergency and parking brake system of the invention as used on a vehicle.

FIG. 2 is a schematic representation of an alternative embodiment of the system of FIG. 1.

FIG. 3 is a modification to the embodiment of FIG. 1 including a second pilot check valve used to provide, in addition to the hydraulically applied service brakes, mechanically actuated, hydraulically released service brakes as well as the emergency, power and parking brakes of the system of FIG. 1.

FIG. 4 is a modification to the embodiment of FIG. 2 in which the hydraulically applied service brakes are eliminated and a second pilot check valve is added to provide mechanically actuated, hydraulically released service brakes, as well as the emergency, power and parking brakes of the system of FIG. 2.

DETAILED DESCRIPTION OF THE PREFERRED EMBODIMENTS

FIG. 1 shows an emergency and parking brake start system 2 used with a vehicle including an engine 4 which drives a power steering pump 6. Pump 6 includes a pump inlet 8 connected to a reservoir output 10 of a hydraulic fluid reservoir 12. Pump 6 also includes a pump outlet 14 coupled to a power steering gear 16 along a line 18, line 18 continuing to the reservoir inlet 20 of reservoir 12.

A governor 22 is positioned along line 18. Governor 22 includes a check valve 24 having an input port 26 connected to pump outlet 14 and an output port 28. Governor 22 also includes a pilot check valve 30 having an inlet port 32 connected to input port 26 and an outlet or reservoir return port 34 through which hydraulic fluid flows to power steering gear 16 along line 18.

Pilot check valve 30 includes a pilot port 36 connected to output port 28. The hydraulic fluid pressure at output port 28 determines whether the flow path between inlet port 32 to return port 34 is open. Pilot check valve 30 is configured so that such flow path opens when the pressure at output port 28, and thus at pilot port 36 (at steady state conditions). reaches a chosen pressure. It should be noted that check valve 24 and pilot check valve 30 are conventional.

The pressure at pump outlet 14 is determined during normal use by the resistance to fluid flow created by power steering gear 16, which is dependent in large part upon how far the operator has turned the steering wheel. Therefore the pressure at input port 26 will vary during operation. Check valve 24, however, maintains the pressure at output port 28 according to the highest pressure which previously existed at input port 26.

If desired governor 22 can include a pressure release valve 38 connected to output port 28 at its release inlet 40 to allow pressure above a predetermined maximum pressure at output port 28 to be reduced. Pressure release valve 38 includes a release outlet 41 fluidly coupled to reservoir 12, as indicated by reference numeral A or to input port 26, as indicated by reference numeral B. When valve 38 is connected at reference numeral B, so that it is in parallel with check valve 24, the entire governor 22 is operationally similar to the governor shown at FIG. 2 in U.S. Pat. No. 4,440,189, the disclosure of which is incorporated by reference. Note that with the governor shown in U.S. Pat. No. 4,440,189, check valve 24 and pressure release valve 38 are incorporated into a single valve.

In the disclosed embodiment of FIG. 1 the vehicle has a pair of conventional front disc service brakes 42 actuated by conventional service brake hydraulic lines 44 and a pair of rear wheel drum brakes 46 also actuated by conventional hydraulic lines 48. To achieve full power emergency and parking brake force at the front wheels, mechanically actuated, hydraulically deactuated spring disc brakes 50 are used in conjunction with conventional disc brakes 42. For example, a spring disc brake made by Minnesota Automotive, Inc. of Mankato. Minn. can be used. Spring disc brakes 50 each includes a disc brake port 52 which are coupled to a common emergency and parking (E&P) brake line 54 through an E&P brake lines 56, 58.

Drum brakes 46, essentially conventional in structure, are mechanically coupled by a pair of cables 60 to a cable puller 62. Cable puller 62 includes a plunger 64 biased to a brake on condition by a strong spring 66. Cable puller 62 includes a shoe brake port 68 fluidly coupled to common E&P brake line 54 through an E&P brake line 70.

Common E&P brake line 54 is fluidly connected to output port 28 through a two-way switch valve 72, shown in a brakes off position in FIG. 1. Switch valve 72 is controlled by the operator through an operator control 74, preferably within the vehicle. Switch valve 72 can be mechanically or electrically operated to switch between the brakes off position of FIG. 1 and a brakes on condition in which common E&P brake line 54 is connected to a dump line 76 connecting valve 72 to reservoir inlet 20. Placing switch valve 72 in the brakes on position allows pressurized hydraulic fluid within E&P brake lines 54, 56, 58 and 70, spring disc brakes 50 and cable puller 62 to drain into reservoir 20. Relieving the pressure within the E&P brake lines thus causes brakes 46 and 50 to be reapplied, typically for parking or during an emergency situation.

At times it is desirable to be able to release the brakes with the engine off. To permit this, a resiliently expandable brake release reservoir 78 is connected to E&P brake line 56 by a pair of lines 80, 82. Line 80 has a check valve 84 positioned along it which allows hydraulic fluid to enter brake release reservoir 78 but not to leave. Line 82 has a shutoff valve 86 positioned along it. When it is necessary to pressurize the E&P brake lines, shutoff valve 86 is opened allowing the hydraulic fluid within reservoir 78 to pressurize the E&P brake lines, spring disc brakes 50 and cable puller 62 thus releasing the brakes.

In some cases pilot check valve 30 may be constructed so that the chosen pressure at which the pilot check valve normally opens is lower than the pressure needed to deactuate brakes 50 or to actuate puller 62. This is not a problem if the user remembers to turn the steering wheel just after starting the engine so to increase the pressure at pump outlet 14 and thus at output port 28. To eliminate the need to turn the steering wheel when the engine is first started, a flow restrictor 88 can be positioned along line 18 between return port 34 and reservoir inlet 20. Flow restrictor 88 is preferably coupled to the starter switch 90 of the vehicle so that restrictor 88 is actuated, thus substantially restricting the flow along line 18, only while the starter motor is operating. If, during this brief period of time, pilot check valve opens, the flow through flow restrictor 88 is sufficiently restricted to create a substantial pressure within E&P brake lines 54, 56, 58 and 70. This may be especially advantageous to permit the rapid charging of expandable reservoir 78. Flow restrictor 88 may be constructed with a time delay to ensure that restrictor 88 remains actuated for a desired length of time, for example two seconds, even if starter switch 90 is released earlier.

In use, the user can start engine 4 with switch valve 72 in the brake off position of FIG. 1 or in the brake on position. If the former, and assuming flow restrictor 88 is used, substantially the entire volume of hydraulic fluid through line 18 is diverted through check valve 24 and into E&P brake lines 54, 56, 58 and 70. disc brakes 50 and cable puller 62 while restrictor valve 88 is actuated. Also, assuming brake release reservoir 78 is used, reservoir 78 is charged with hydraulic fluid during this time. After engine 4 starts, starter switch 90 is released to open flow restrictor 88 so that restrictor 88 no longer affects the operation of the system.

Assuming the pressure at output port 28 is above the chosen pressure, pilot check valve 30 is open allowing flow from inlet port 32 to return port 34, along line 18, through power steering gear 16, and finally to reservoir 12. If, however, during the initial charging of the system the pressure at output 28 is high enough to allow pressure release valve 38 to open, such excess pressure can be reduced through valve 38 either directly to reservoir 12 as indicated by reference letter A or to input port 26 as indicated by reference letter B. Assuming the B connection is used and assuming any overpressure at output port 28 is not caused by an overpressure at input port 26, connecting released outlet to input port 26 allows this overpressure to be reduced by dumping the excess fluid through pilot check valve 30, along line 18, through power steering gear 16 and to reservoir 12.

If an emergency occurs during driving so that is necessary to apply emergency brakes, such as if the service brakes fail, the operator actuates operator control 74 to place switch valve 72 to its brakes on condition thus connecting lines 54, 76. Doing so dumps the high pressure hydraulic fluid within the E&P brake lines to reservoir 12 thus allowing spring disc brakes 50 to be applied and allowing cable puller 62 to apply drum brakes 46. When switch valve 72 is in this position, pilot check valve 30 remains open so that provision of hydraulic fluid to power steering gear 16 is not affected. As a parking brake, the operator also places switch valve 72 in its brakes on position to apply the brakes.

Referring now to FIG. 2, an alternative embodiment of system 2 of FIG. 1 is shown. Like elements are identified with like reference characters. System 2 is similar to system 2 with the following main differences. The vehicle does not have a complete power steering system, but does have power steering pump 6 and reservoir 12. Lacking a power steering gear 16, there is no need for a flow restrictor 88. Instead of switch valve 72, lines 54 and 76 are connected at a tee 92 and a shut-off valve 94 along line 76 between tee 92 and reservoir 12. As with switch valve 72, shut-off valve 94 is controlled by operator control 74. When it is desired to apply brakes 46, 50, the user operates control 74 to open valve 94. This permits hydraulic fluid in lines 54, 56, 58 and 70 to flow into reservoir 12. Due to the relatively unimpeded pathway along line 76, continued operation of pump 6 after valve 94 has been opened will have minimal effect on the actuation of brakes 46, 50.

Turning now to FIG. 3, a further embodiment of the invention is disclosed. The embodiment of FIG. 3 is similar to that of FIG. 1 with like reference numerals indicating like components. Hydraulic brake lines 44, 48 are shown connected to a conventional dual master cylinder 102 which is connected to a conventional brake pedal 104. A second pilot check valve 106 has its pilot port 108 coupled to brake line 48, its inlet port 110 coupled to common E&P brake line 54 through a line 111 and its output port 112 coupled to reservoir inlet 20 through a line 114. System 2a thus provides the vehicle with mechanically actuated, hydraulically deactuated service brakes, as well as emergency, power, and parking brakes.

Pressing on brake pedal 104 actuates dual master cylinder 102 causing lines 44, 48 to pressurize thus actuating conventional hydraulically actuated brakes 42, 46. In addition, pressure at pilot port 108 causes the flow path between inlet port 110 and outlet port 112 of pilot check valve 106 to open allowing pressurized fluid within brake lines 54, 56, 58 and 70 to be dumped to reservoir 12 through lines 111, 114 and valve 106. This permits the application of spring disc brakes 50 and cable pullers 62, thus mechanically applying brakes 46 through cables 60, whenever the service brakes are applied. Note that this does not replace the emergency parking brake aspect of system 2 of FIG. 1 since once the brake pedal is released, second pilot check valve 106 again blocks the flow of fluid from line 111 to line 114. Therefore, in any true emergency situation two way switch valve 72 would still normally be actuated through operator control 74 so to ensure fluid is dumped from line 54 to reservoir 12 even if brake pedal 104 is no longer depressed. Of course for parking purposes, such as when the engine is running while the operator is away from the vehicle, two way switch valve 72 is necessary to keep the brakes applied.

Service brakes are generally applied in a modulated fashion, as opposed to emergency and parking brakes which are commonly applied on a semi-modulated basis. The pressure within brake line 48 is determined by the force exerted by pedal 104 against master cylinder 102. Accordingly, to achieve modulated braking from second pilot check valve 106, check valve 106 is preferably of the type in which the degree of restriction to fluid flow from inlet port 110 to outlet port 112 is proportional to the pressure applied at pilot port 108. This is another reason for including valve 72, which does not impose any substantial restriction to the fluid flow from line 54 to reservoir 12.

Present spring disc brakes, such as could be used as mechanically actuated, hydraulically released brakes, often have a relatively small hydraulic cylinder. Although such a cylinder is useful when the brakes are intended for parking and emergency use only, they do not allow sufficient modulation to be useful as service brakes. Therefore, spring disc brakes can be made with sufficiently large hydraulic actuation cylinders. Alternatively, a hydraulic step-down piston and cylinder arrangement could be used at the port of the spring disc brake. Such an arrangement uses a large diameter piston and cylinder in series with a small diameter piston and cylinder. By placing the small diameter piston and cylinder toward the brake port, and by properly sizing the pistons and cylinders, proper brake modulation can be achieved.

Referring now to FIG. 4, an alternative embodiment of system 2' of FIG. 2 is shown. System 2b is similar to the system 2a of FIG. 3 in that it includes a second pilot check valve 106 having inlet and outlet ports 110, 112 which couple common E&P brake line 54 with inlet 20 of reservoir 12 through lines 111, 114. The distinctions include the fact that only a single cylinder master cylinder 116 is used, as opposed to dual cylinder master cylinder 106. Also, conventional hydraulically actuated disc brakes 42 are eliminated and conventional shoe brakes 46 are replaced by mechanically actuated shoe brakes 46b. Thus, all brakes with system 2b are mechanically actuated, hydraulically deactuated. Pressing on brake pedal 104 causes brakes 50, 46b to be actuated in a controlled or modulated manner. The force exerted on brake pedal 104 determines the restriction to fluid flow between ports 110 and 112 which in turn determines the braking force at brakes 50, 46b. Of course during emergencies or parking, shutoff valve 94 can be actuated by operator control 74 thus dumping fluid within lines 54, 56, 68 and 70 to reservoir 12.

In some situations it may be desired to physically isolate the brake fluid within line 48 from port 108 in the second pilot check valve 106. A plunger operated check valve, such as sold by Deltsol Fluid Products of Bellwood, Ill. can be used instead of a conventional pilot check valve to achieve the desired physical isolation. In the embodiment of FIG. 4, power steering fluid can be used in master cylinder 116 to eliminate the need for both power steering and brake fluid.

With the embodiment of FIG. 4 the need for conventional power assisted brakes is eliminated since the braking force is supplied mechanically during all conditions while the brakes are released through the fluid pressure provided by pump 6. This eliminates many of the design problems associated with many conventional power assisted brakes which rely on engine vacuum and power steering for their source of power. This is especially important when dealing with highly tuned engines intended to provide maximum performance and maximum fuel efficiency. The conventional hydraulically actuated brake 42, 46 of the embodiment of FIG. 3 could be chosen so not to be vacuum power assisted brakes (or even eliminated) so that such embodiment would provide the same advantages of the embodiment of FIG. 4 insofar as not affecting the engine vacuum when the service brakes are applied. Also, eliminating the hydraulically actuated service brakes permits single cylinder master cylinder 116 to be used instead of dual master cylinder 102 and the elimination of associated brake lines 44, 48, thus making such a system much simpler and less costly. True wheel-by-wheel braking is possible, even though only a single master cylinder need be used.

Modification and variation can be made to the disclosed embodiments without departing from the subject of the invention as defined in the following claims. For example, when the present invention is used with vehicles not having power steering, sources of pressurized hydraulic fluid other than power steering pumps can be used. The preferred embodiments have been shown with both discs and drum brakes. The invention is, however, not limited to this or other particular brake types or configurations. Instead of the master cylinder/second pilot check valve combination, other structure for providing a variable restriction pathway from E&P line 54 to reservoir 12 could be used. For example, pedal 104 could be connected to an electrical position sensor which in turn would be connected to a normally closed, variable restriction solenoid valve used to connect E&P line 54 to reservoir 12; when pedal 104 is depressed, fluid in line 54 would be dumped to reservoir 12 at a rate proportional to the amount the pedal is depressed. Since reverse flow from reservoir 12 to pilot check valves 30, 106 along lines 18, 114 does not occur, valves 30, 106 need not be check valves, just pilot valves. That is, valves 30, 106 need not be constructed to permit fluid flow from their outlet ports 34, 112 to their inlet ports 32, 110. However, pilot check valves can be used since they are readily available and operate as desired.

I claim:

1. A mechanical emergency and parking brake system for vehicles of the type having a hydraulic fluid pump, the pump having a pump inlet coupled to the reservoir outlet of a hydraulic fluid reservoir and a pump outlet coupled to the reservoir inlet of the reservoir, the system comprising:
   a check valve having an input port, coupled to the pump outlet, and an output port and configured to permit fluid flow from the input port to the output port and to restrict fluid flow from the output port to the input port;
   a pilot valve including an inlet port connected to the input port, a return port coupled to the reservoir inlet and a pilot port fluidly coupled to the output port, the pilot valve configured to prevent fluid flow from the inlet port to the return port when the pressure at the pilot port is below a first chosen value and to permit fluid flow from the inlet port to the return port when the pressure at the pilot port is above a second chosen value;
   a mechanically actuated, fluid pressure released brake including a brake port connected to the output port, whereby the brake is released upon application of fluid pressure to the brake port;
   a user actuated valve operable to fluidly couple the brake port to the reservoir inlet to allow the brake to be actuated;
   user controlled service brake actuating means for creating a variable level external input; and
   a variable restriction valve having a second inlet port connected to the brake port and a second return port connected to the reservoir inlet, the variable restriction valve configured to provide a variable restriction to fluid flow from the second inlet port to the second return port according to the level of the variable level external input applied to the variable restriction valve by the service brake actuating means. so the brake is applied in a modulated manner according to the level of the variable level external input.

2. The system of claim 1 wherein the variable restriction valve includes a second pilot valve, having a second pilot port, and the service brake actuating means including a brake pedal and a user-controlled master cylinder, connected to the brake pedal, having a master cylinder port, coupled to the pilot port, the pilot port being pressurized upon actuation of the master cylinder.

3. The system of claim 1 wherein the pilot valve is a pilot check valve.

4. The brake system of claim 1 wherein the check valve includes a spring biased, fluid flow blocking element.

5. The brake system of claim 1 further comprising a pressure release element fluidly coupled to the output port to limit the pressure at the output port to a limit pressure.

6. The brake system of claim 5 wherein the pressure release element and the check valve are combined to form a check relief valve.

7. The brake system of claim 5 wherein the pressure release element fluidly couples the output port to the input port.

8. The brake system of claim 5 wherein the pressure release element includes a pressure release valve fluidly coupling the output port to the reservoir inlet.

9. The brake system of claim 1 wherein the first and second chosen values are about equal.

10. The brake system of claim 1 further comprising a flow restrictor fluidly coupled along a line between the return port and the reservoir inlet, the flow restrictor operable to restrict flow along the line while the flow restrictor is actuated.

11. The brake system of claim 10 wherein the flow restrictor is remotely actuated.

12. The brake system of claim 10 wherein the flow restrictor is operably coupled to a starter switch so that the flow restrictor temporarily restricts flow along the line upon actuation of the starter switch.

13. The brake system of claim 10 wherein the flow restrictor is configured to restrict flow along the line only while the starter switch is actuated.

14. The brake system of claim 1 wherein the user actuated valve couples the brake port to the reservoir inlet when in a brake on position and blocks fluid flow from the brake port to the reservoir when in a brake off position.

15. The brake system of claim 14 wherein the user actuated valve couples the brake port to the output port when in a brakes off position.

16. The brake system of claim 14 wherein the brake port remains coupled to the output port regardless of the position of the user actuated valve.

17. The brake system of claim 1 wherein the brake includes first and second disc brakes.

18. The brake system of claim 1 wherein the brake includes first and second drum brakes mechanically coupled to a spring powered mechanical actuator, the mechanical actuator including a fluid powered deactuator which acts to deactuate the mechanical actuator upon application of fluid pressure to the deactuator.

19. A mechanical emergency and parking brake system for vehicles of the type having a hydraulic fluid pump, the pump having a pump inlet coupled to the reservoir outlet of a hydraulic fluid reservoir and a pump outlet coupled to the reservoir inlet of the reservoir, the system comprising:
   a check valve having an input port, coupled to the pump outlet, and an output port and configured to permit fluid flow from the input port to the output port and to restrict fluid flow from the output port to the input port;
   a first pilot valve including an inlet port connected to the input port, a return port coupled to the reservoir inlet and a pilot port fluidly coupled to the output port, the first pilot valve configured to prevent fluid flow from the inlet port to the return port when the pressure at the pilot port is below a first chosen value and to permit fluid flow from the inlet port to the return port when the pressure at the pilot port is above a second chosen value;

a mechanically actuated, fluid pressure released first brake including a brake port connected to the output port, whereby the first brake is released upon application of fluid pressure to the brake port;

a user actuated valve operable to fluidly couple the brake port to the reservoir inlet to allow the first brake to be actuated;

a fluid pressure actuated second brake;

a user-controlled master cylinder fluidly coupled to the second brake through a brake line to apply the second brake upon pressurization of the brake line; and a second pilot valve having a second inlet port connected to brake port, a second return port coupled to the reservoir inlet and a second pilot port coupled to brake line, the second pilot valve configured to prevent fluid flow from the second inlet port to the second return port when the pressure at the second pilot port is below a third chosen value and to permit fluid flow from the second inlet port to the second return port when the pressure at the second pilot port is above a fourth chosen value;

whereby actuation of the master cylinder causes the first and second brakes to be actuated.

20. A mechanical emergency and parking brake system for vehicles of the type having a power steering pump, a power steering gear and a power steering fluid reservoir, the pump having a pump inlet coupled to a reservoir outlet of the reservoir and a pump outlet coupled to the power steering gear, the power steering gear being fluidly positioned along a line between the pump outlet and a reservoir inlet of the reservoir, the system comprising:

a check valve having an input port, coupled to the pump outlet, and an output port and configured to permit fluid flow from the input port to the output port and to restrict fluid flow from the output port to the input port;

a pilot valve including an inlet port connected to the input port, a return port coupled to the power steering gear and a pilot port fluidly coupled to the output port, the pilot valve configured to prevent fluid flow from the inlet port to the return port when the pressure at the pilot port is below a chosen value and to permit fluid flow from the inlet port to the return port when the pressure at the pilot port is above the chosen value;

the check valve including a pressure release element fluidly coupling the output port to the input port to limit the pressure at the output port to a limit pressure;

a flow restrictor fluidly coupled along the line in the region between the return port and the reservoir inlet, the flow restrictor operably coupled to a starter switch to temporarily restrict flow along the line after the starter switch is actuated;

a spring actuated, fluid pressure released brake including a brake port connected to the output port, whereby the brake is released upon application of fluid pressure to the brake port;

a user actuated valve operable to fluidly couple the brake port to the reservoir inlet to allow the spring actuated, fluid pressure released brake to actuate;

a user-controlled master cylinder having a master cylinder port which is pressurized upon actuation of the master cylinder;

a second pilot valve having a second inlet port connected to brake port, a second return port coupled to the reservoir inlet and a second pilot port coupled to brake line, the second pilot valve configured to prevent fluid flow from the second inlet port to the second return port when the pressure at the second pilot port is below a third chosen valve and to permit fluid flow from the second inlet port to the second return port when the pressure at the second pilot port is above a fourth chosen valve;

whereby actuation of the master cylinder causes the brake to be actuated.

21. A mechanical emergency and parking brake system for vehicles comprising:

a hydraulic fluid pump;

a hydraulic fluid reservoir having a reservoir inlet and a reservoir outlet;

the pump having a pump inlet coupled to a reservoir outlet and a pump outlet coupled to a line between the pump outlet and the reservoir inlet;

a governor including:

a check valve having an input port, coupled to the pump outlet, and an output port and configured to permit fluid flow from the input port to the output port and to restrict fluid flow from the output port to the input port;

a first pilot valve including a first inlet port connected to the input port, a first return port coupled to the reservoir and a first pilot port fluidly coupled to the output port, the first pilot valve configured to prevent fluid flow from the first inlet port to the first return port when the pressure at the first pilot port is below a chosen value and to permit fluid flow from the first inlet port to the first return port when the pressure at the first pilot port is above the chosen value; and the check valve including a pressure release element fluidly coupling the output port to the input port to limit the pressure at the output port to a limit pressure;

a spring actuated, fluid pressure released first brake including a brake port connected to the output port, whereby the first brake is released upon application of fluid pressure to the brake port;

a user actuated valve operable to fluidly couple the brake port to the reservoir inlet to allow the spring actuated, fluid pressure released first brake to actuate;

a fluid pressure actuated second brake;

a user-controlled master cylinder fluidly coupled to the second brake through a brake line to apply the second brake upon pressurization of the brake line;

a second pilot valve housing a second inlet port connected to brake port, a second return port coupled to the reservoir inlet and a second pilot port coupled to brake line, the second pilot check valve configured to prevent fluid flow from the second inlet port to the second return port when the pressure at the second pilot port is below a third chosen value and to permit fluid flow from the second inlet port to the second return port when the pressure at the second pilot port is above a fourth chosen value;

whereby actuation of the master cylinder causes the first and second brakes to be actuated.

22. A mechanical emergency and parking brake system for vehicles of the type having a hydraulic fluid pump, the pump having a pump inlet coupled to the reservoir outlet of a hydraulic fluid reservoir and a pump outlet coupled to the reservoir inlet of the reservoir, the system comprising:

a check valve having an input port, coupled to the pump outlet, and an output port and configured to permit fluid flow from the input port to the output port and to restrict fluid flow from the output port to the input port;

a pilot valve including an inlet port connected to the input port, a return port coupled to the reservoir inlet and a pilot port fluidly coupled to the output port, the pilot valve configured to prevent fluid flow from the inlet port to the return port when the pressure at the pilot port is below a first chosen value and to permit fluid flow from the inlet port to the return port when the pressure at the pilot port is above a second chosen value;

a mechanically actuated, fluid pressure released brake including a brake port connected to the output port, whereby the brake is released upon application of fluid pressure to the brake port; and a user actuated valve operable to fluidly couple the brake port to the reservoir inlet to allow the brake to be actuated.

23. A mechanical emergency and parking brake system for vehicles of the type having a power steering pump, a power steering gear and a power steering fluid reservoir, the pump having a pump inlet coupled to a reservoir outlet of the reservoir and a pump outlet coupled to the power steering gear, the power steering gear being fluidly positioned along a line between the pump outlet and a reservoir inlet of the reservoir, the system comprising:

a check valve having an input port, coupled to the pump outlet, and an output port and configured to permit fluid flow from the input port to the output port and to restrict fluid flow from the output port to the input port;

a pilot valve including an inlet port connected to the input port, a return port coupled to the power steering gear and a pilot port fluidly coupled to the output port, the pilot valve configured to prevent fluid flow from the inlet port to the return port when the pressure at the pilot port is below a chosen value and to permit fluid flow from the inlet port to the return port when the pressure at the pilot port is above the chosen value;

the check valve including a pressure release element fluidly coupling the output port to the input port to limit the pressure at the output port to a limit pressure;

a flow restrictor fluidly coupled along the line in the region between the return port and the reservoir inlet, the flow restrictor operably coupled to a starter switch to temporarily restrict flow along the line after the starter switch is actuated;

a spring actuated, fluid pressure released brake including a brake port connected to the output port, whereby the brake is released upon application of fluid pressure to the brake port; and a user actuated valve operable to fluidly couple the brake port to the reservoir inlet to allow the spring actuated, fluid pressure released brake to actuate.

* * * * *